(12) United States Patent
Higgins

(10) Patent No.: US 8,255,181 B2
(45) Date of Patent: Aug. 28, 2012

(54) CORRECTING TILT-INDUCED CYCLIC VARIATIONS IN SIGNALS FROM RADIALLY ARRAYED SPECTROPHOTOMETER SENSORS

(75) Inventor: Thomas Edward Higgins, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 819 days.

(21) Appl. No.: 12/352,018

(22) Filed: Jan. 12, 2009

(65) Prior Publication Data

US 2010/0179783 A1  Jul. 15, 2010

(51) Int. Cl.
*G01D 18/00* (2006.01)
(52) U.S. Cl. ........ 702/104; 702/106; 356/405; 356/492; 356/508
(58) Field of Classification Search .................. 702/104, 702/106; 356/405, 508, 492
See application file for complete search history.

(56) References Cited

U.S. PATENT DOCUMENTS

| | | | |
|---|---|---|---|
| 5,691,817 A * | 11/1997 | Cargill et al. | ............... 356/405 |
| 6,384,918 B1 | 5/2002 | Hubble, III et al. | |
| 6,603,551 B2 | 8/2003 | Mestha et al. | |
| 6,633,382 B2 | 10/2003 | Hubble, III et al. | |
| 6,809,855 B2 | 10/2004 | Hubble, III et al. | |
| 7,239,833 B2 * | 7/2007 | Tomita et al. | ............... 399/299 |

* cited by examiner

*Primary Examiner* — Jonathan C Teixeira Moffat
*Assistant Examiner* — Hien Vo
(74) *Attorney, Agent, or Firm* — Pillsbury Winthrop Shaw Pittman LLP

(57) ABSTRACT

A correction algorithm may be applied for correcting misalignment of a radially-aligned array of sensors. Due to the tilt, signals from sensors that are further away from the media, may become slightly attenuated, while signals from sensors that are closer to the media are slightly increased. The error appears periodic and largely sinusoidal in nature around the array given the circular nature of the array of sensor elements. The algorithm determines the magnitude and phase of a sinusoidal function that best fits the wavelength data. In one embodiment, a discrete Fourier transform may be performed at the 'frequency' equivalent to one period around the array to determine the magnitude and phase estimate thereof. Then, a sinusoidal correction function may be generated using the magnitude and the phase in order to correct the reflectance data.

21 Claims, 5 Drawing Sheets

CORRECTING TILT-INDUCED CYCLIC VARIATIONS IN SIGNALS FROM RADIALLY ARRAYED SPECTROPHOTOMETER SENSORS

FIELD

This application relates to methods and systems for correcting tilt-induced cyclic variations in signals from radially arrayed spectrophotometer sensors.

BACKGROUND

FIG. 1 shows a front perspective view of an inline spectrophotometer (ILS) 10 for making color measurements of substrates 25. For example, the ILS 10 may be an X-Rite® ILS15 radially-arrayed spectrophotometer available from X-rite Inc. (Grand Rapids, Mich.).

The ILS 10 generally includes a housing 11 enclosing a illuminator 12 and a ring 13 of photosensors 14. The ILS 10 may be used to take color measurements, for example, of inks 26 and the substrate 25. A processor (not shown), such as an integrated circuit and/or software, may be provided for analyzing measured color data.

The substrate 25 may be one or more of: 8½×11 inch letter paper, A4 letter paper, or 8½×14 inch legal paper. However, it will be appreciated that other sizes and substrate media types may similarly be used, such as, bond paper, parchment, cloth, cardboard, plastic, transparencies, film, foil, or other print media substrates. The substrate 25 may also be a reference calibration tile.

The substrate 25 may be generally located in an XY target plane spaced below the ILS 10, and may be moved, for example, with a conveying device (not shown), with respect to the ILS 10 in a process direction. An area 27 of the substrate 25 may be illuminated by light 16 produced by the illuminator 12. In one implementation, the illuminator 12 may be a fluorescent lamp, producing broad spectrum of "white" light across the visible spectrum (i.e., from about 400 to 700 nm (in wavelength)). Other illuminators may similarly be used, such as light emitting diodes (LEDs).

Light reflected from the inks 26 or the substrate 25 may be generally directed in various directions, with a portion 16' thereof (shown) directed toward the ring 13 of photosensors 14 for measurements.

FIG. 2 shows a bottom plan view of the ILS 10 shown in FIG. 1. In the implementation shown, the ring 13 includes sixteen (16) photosensors 14a-14p, such as photodiodes, spaced equally about in a circular manner. In one implementation, the ring 13 many have an inner nominal radius of approximately 1 cm, although it will appreciated that other configurations and/or sizes are possible. The photosensors 14a-14p are positioned radially around the spectrophotometer in the same plane, and may be selectively filtered or otherwise configured to detect light of specific wavelength.

The output of the ILS 10 may be normalized (i.e., calibrated) as is generally known in the art when making color measurements. These measurements are typically fed back to the printer for controlling various aspects of color output.

However, if the plane of the sensor is titled with respect to the surface plane of a measured object, the sensor ILS 10 signal response will be modulated by the cyclically varying distance of the sensors from the measured object surface as a function of the heading angle of the tilt with respect to the heading angle of the sensors.

FIG. 3 shows a plot of measured reflectance values of a white piece of paper using the X-Rite® ILS15. Due to the tilt, signals from photosensors that are further away from the media, may become slightly attenuated, while signals from sensor that are closer to the media may be slightly increased.

This may result in errors in color measurement, and ultimately in color reproduction errors when the sensor is used in a system for color correction feedback.

SUMMARY

According to one aspect of the application, a method for correcting misalignment of a color measuring device including a plurality of sensors and at least one illumination source is provided comprising: receiving with the plurality of sensors radiation reflected off a calibration medium from the illumination source; correlating, for each sensor in the device, the sensor measurements with at least one relative geometrical contribution based on its position with respect to a reference frame; determining a magnitude and a phase of the misalignment based on the correlated sensor measurements; and correcting each sensor measurement based on the determined magnitude and the phase.

According to another aspect of the application, a color measuring system is provided comprising: a color measuring device including a plurality of sensors and at least one illumination source; and a processor configured to: receive with the plurality of sensors radiation reflected off a calibration medium from the illumination source; correlate, for each sensor in the device, the sensor measurements with at least one relative geometrical contribution based on its position with respect to a reference frame; determine a magnitude and a phase of the misalignment based on the correlated sensor measurements; and correct each sensor measurement based on the determined magnitude and the phase.

Other objects, features, and advantages of one or more embodiments of the present application will seem apparent from the following detailed description, and accompanying drawings, and the appended claims.

BRIEF DESCRIPTION OF THE DRAWINGS

Embodiments of the present application will now be disclosed, by way of example only, with reference to the accompanying schematic drawings in which corresponding reference symbols indicate corresponding parts, in which.

DETAILED DESCRIPTION

Figure 1:
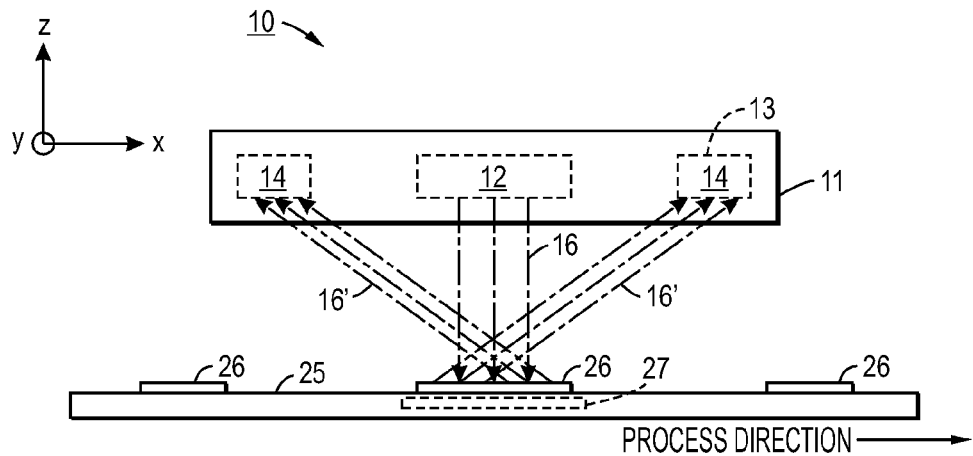
FIG. 1 shows a front perspective view of an inline spectrophotometer (ILS) for making color measurements of printed media.
Figure 4:
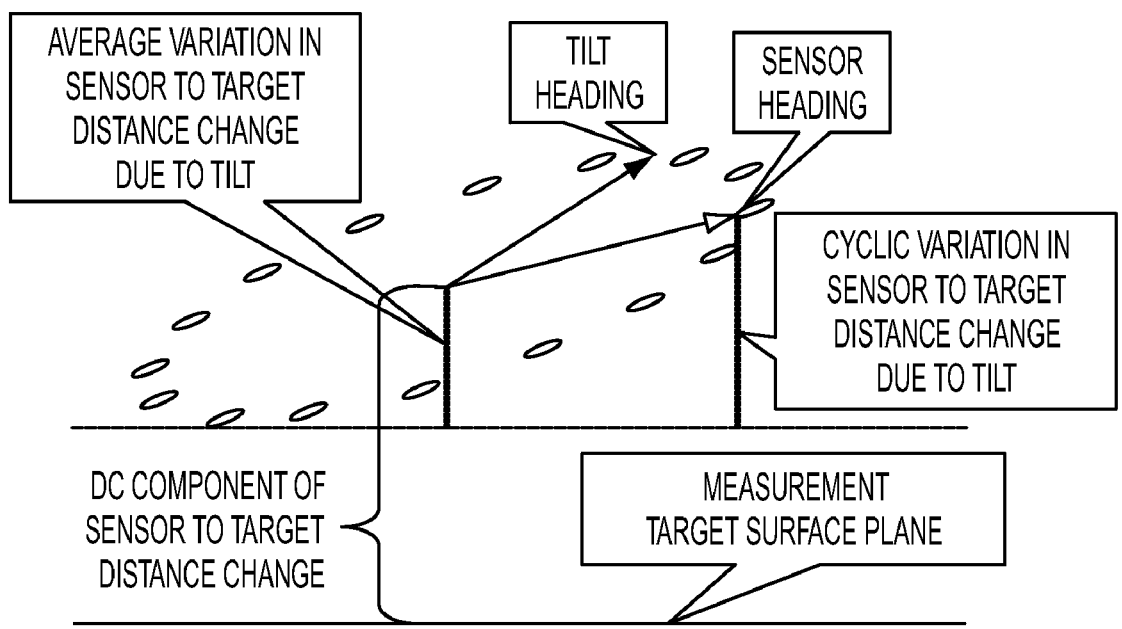
FIG. 4 shows a schematic representation of a color measuring sensor device having a tilt with respect to the target surface plane.

FIG. 4 shows a schematic representation of a color measuring device having a tilt with respect to the target surface plane. The color measuring device may be the X-Rite® ILS (FIG. 1). Although, it will be appreciated that other radially aligned photosensor devices may similarly be used, and any reference herein to the X-Rite® ILS is not to be construed as limiting.

Experiments reveal that cyclic variations due to the tilt of the color measuring device correlate to the variation in distance of the corresponding sensors from the surface. Due to the tilt, signals from photosensors that are further away from the target surface, may become slightly attenuated, while signals from the photosensors that are closer to the media may be slightly increased.

Figure 3:
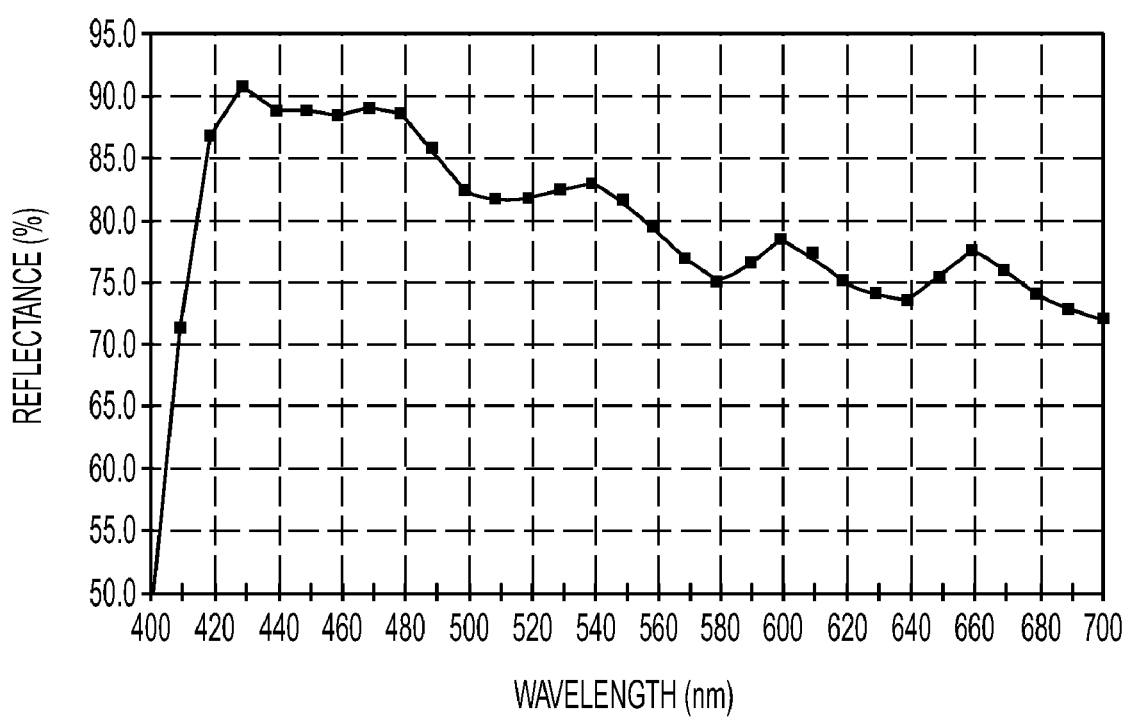
FIG. 3 shows a plot of measured reflectance values of a white piece of paper using the X-Rite® ILS15.

There is a corresponding phenomenon when calibrating the sensor while it is tilted with respect to a calibration or reference tile. Typically, the reference tile may be a white calibration tile as known in the art. In this case, it may be inferred that the cyclic sensor signal attenuations are compensated for by corresponding cyclic gains adjustments applied within the sensor. In subsequent measurements, if the sensor is similarly tilted with respect to a measured target surface, the cyclic gains changes may generally cancel the cycle attenuation variations resulting in a correct measurement. However, if the alignment of the sensor with respect to the measured target surface is not the same as it was with respect to the calibration tile, the cyclic gain changes will induce an anomalous cyclic variation in the sensor signals as reported by the sensor similar to the cyclic phenomenon shown in the plot of FIG. 3.

It is believed that the observed cyclic variations of the sensor signals have contributions from both of the phenomenon described above. The cyclic attenuation effect will also have a common direct current (DC) component of attenuation due to the average increase in distance among the photosensors.

In particular, a methodology is provided for estimating the relative magnitude and phase of the cyclic modulation imposed on the sensor by the sensor plane tilt, and making corrective adjustments to the sensor signals so as to reduce the cyclic modulation, resulting in a more accurate rendition of a color measurement.

According to an aspect of the application, an algorithm may be provided that models the measured response observation from the sensor when the sensor plane is tilted with respect to the target surface. The algorithm may gauge the magnitude and the phase, as well as the proportionate effect on the signal level for each photosensor, for proportionately correcting for this error.

In one embodiment, a discrete Fourier transform may be performed at the 'frequency' equivalent to one period around the array to determine the magnitude and phase estimate. It may be assumed that the substrate measurement does not have a spectral response at a 'frequency' substantially equivalent to one period around the array. Thus, the measurement reflectance data may be corrected using the magnitude and the phase in order of the sinusoidal function.

Measurement values M from the photosensors are presumed to approximate reflectance values R modulated by factors correlated to the variations in distance of the tilted photosensors with respect to the target surface, and that these factors are a cyclic function of the difference $\Phi$ between the sensor headings $\Theta$ and the tilt heading $\lambda\_tilt$. Accordingly, the measured values $M_j$ of a particular photosensor [j] may be characterized accordingly to equation (1), as follows:

$$M_j = R_j*(1+A\ Cosine\ [\phi_j]) = R_j + R_j\ A\ Cosine\ [\phi_j] \quad (1)$$

where: $\phi_j = \Theta_j - \lambda\_tilt$; and
A=amplitude of the effect of tilt on the signal.
$\lambda\_tilt$=tilt heading; and
$\Theta_j$=heading of a particular photosensor;

It is noted that the DC offset contributions of attenuation (i.e., $R_j$) may not be effectively isolated with respect to the gain. However, they may be presumed to, on average, cancel each other out with the resulting observable modulation effect being only the sinusoidal alternating current (AC) contribution, i.e. $R_j\ A\ Cosine\ [\Phi_j]$.

In order to determine the tilt heading and the magnitude of the effect on the sensor signals, a signal may be decomposed into orthogonal reference components whose relative contribution may be resolved with an inner product between the signal and the reference components. The reference components may be the sinusoidal function values of sensor headings $\Theta_j$ relative to a reference frame. The resultant inner products are proportional to sinusoidal functions.

Consequently, the tilt heading may be determined using the arctangent function, and the magnitude of the effect on the signal A may be determined by the root-sum-square of the effect on the inner products.

Since the sensor may be repeatedly moved between a calibration mode (e.g., looking at the reference tile) and an operation mode (e.g., looking at the target surface) there may be frequent variations in the misalignment between the sensor for the calibration tile and target surfaces. In particular, it may not be possible to determine whether there is a DC attenuation or gain. However, according to an aspect of the application, the cyclic variations that result from the combination of these effects may be characterized nonetheless.

An exemplary process for determining and correcting the cyclical contributions of error due to the tilt of the sensor array may be provided as follows. The process determines the magnitude and phase of the sinusoid function that best fits the sensor measurement data relative to the tilt heading.

It is noted that non-uniformity of the actual reflectance and other practical adjustments described herein may negatively impact the inner product computations. Thus, to eliminate this bias, the algorithm may use neighboring-wavelength-differential sensor data (i.e., the difference in measurements between neighboring sensors in a set of photosensor data) rather than the actual sensor data measurements. Neighboring-wavelength-differential of reference values may also be applied to preserve the relative phase.

A set of photosensor data may first be defined. In one implementation, an array (or matrix) may be defined, corresponding to information the photosensors of the sensor, with each photosensor having a corresponding entry [i] the array, where i=1 to N (the total number of photosensors in the sensor). For example, for the sensor device depicted in FIG. 1, there are sixteen photosensors 14a-14p.

The set of photosensor data is ordered such that entries for the photosensors are increasing by wavelength sensitive W. Thus, the array may be considered strictly monotonically with the respect to the sensitive wavelength of the sensors 14a-p.

A reference frame may be defined with respect to the sensor. For example, the reference frame may correspond to an axis running through the center of the sensor coincident with the process direction. Thus, heading angles $\Theta$ may be determined for each of the photosensors, for example, as measured counterclockwise from the reference axis.

Wavelength sensitivity values W may also be determined for each of the photosensors with respect to the reference axis. These values may be provided by the device manufacture and/or obtained by geometrical measurements of the sensor device itself.

Figure 2:
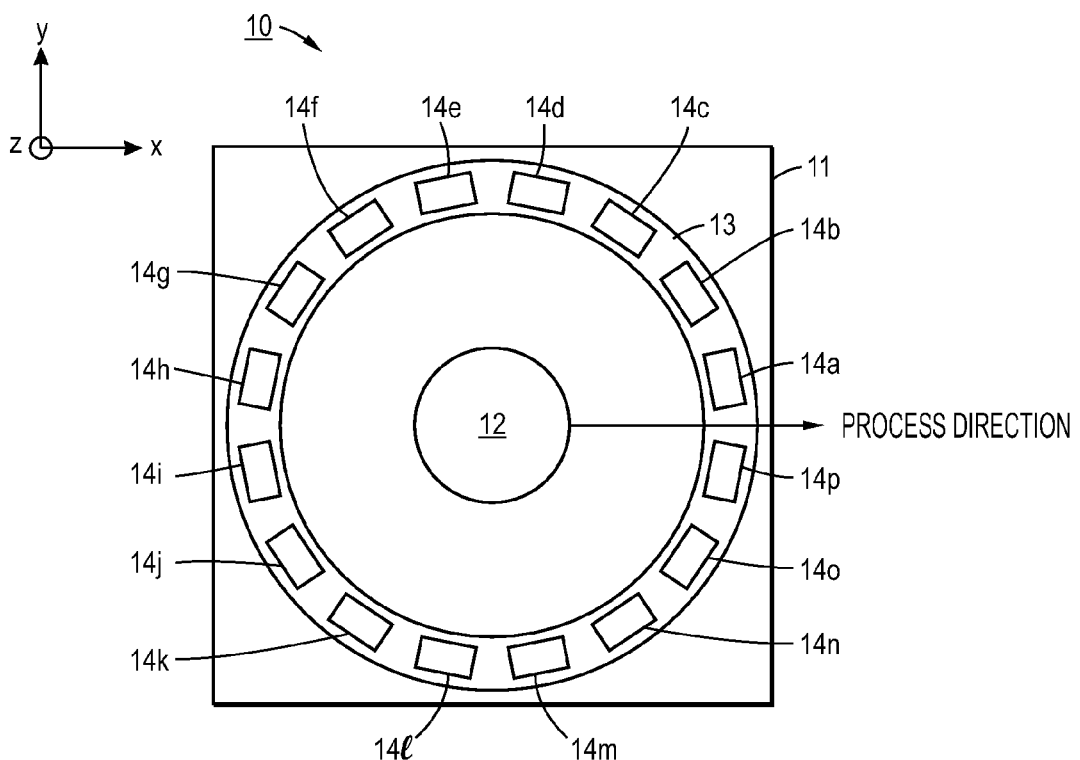
FIG. 2 shows a bottom plan view of the ILS shown in FIG. 1.

Table I shows exemplary sensitivity values W and heading angles $\Theta$ for the photosensors 14a-14p shown in FIGS. 1 and 2.

TABLE I

| Photosensor | W (nm) | Θ (degrees) |
|---|---|---|
| 14a | 580 | 11.25 |
| 14b | 520 | 33.75 |
| 14c | 460 | 56.25 |
| 14d | 400 | 78.75 |
| 14e | 660 | 101.25 |
| 14f | 600 | 123.75 |
| 14g | 540 | 146.25 |
| 14h | 480 | 168.75 |
| 14i | 429 | 191.25 |
| 14j | 560 | 213.75 |
| 14k | 620 | 236.25 |
| 14l | 680 | 258.75 |
| 14m | 500 | 281.25 |
| 14n | 440 | 303.75 |
| 14o | 700 | 326.25 |
| 14p | 640 | 348.75 |

For equally-spaced wavelength sensors 14a-p having an increasing change in wavelength ΔW, the sensitivities may be determined from equation (2) as follows:

$$W_i = W_1 + \Delta W * (i-1) \quad (2)$$

For example, for the sensor data in Table I, ΔW=20 nm.

The reference frame may correspond to the process direction (i.e., Θ=0 degrees). For the X-Rite ILS15 and/or other sensors, the heading angles $\Theta_i$ may be independent of (i.e. not monotonic with) wavelength sensitivities $W_i$. Rather, the heading angle for each photosensor $\Theta_i$ is based on its placement in the device and the orientation of device.

A tilt may be defined as a vector from the center of the sensor to the point that is the furthest distance from the target surface plane. The tilt may have two independent factors, attitude and heading. The tilt attitude is the angle of the tilt vector measured from the plane (including the center of the sensor) which is parallel to the target surface. The tilt heading is the angle of the projection of the tilt vector onto the plane (including the center of the sensor) which is parallel to the target surface with respect to a reference axis. In one implementation, the reference axis may be same as the one used in determining the photosensor heading, with tilt heading measured counterclockwise from the reference axis. (see FIG. 1). The tilt heading may be measured counterclockwise from the reference axis.

Next, relative distance variations for each photosensor that correspond to the tilt headings λ_tilt of 0 and −90 degrees (or 270 degrees), respectively, may be then determined.

In particular, the tilt heading may be correlated with geometry of the photosensors. For example, the tilt heading distance C corresponding to the tilt heading angle of 0 degrees may be determined according to equation (3) as follows:

$$C_i = \text{Cosine}[\Theta_i] \quad (3)$$

Similarly, the tilt heading distance S corresponding to a tilt heading angle of −90 degrees, which may be equivalent to the sine function of the sensor heading, may be determined according to equation (4) as follows:

$$S_i = \text{Sine}[\Theta_i] = \text{Cosine}[\Theta_i - 90 \text{ degrees}] \quad (4)$$

Next, adjacent-wavelength-differential relative distance variations corresponding to heading angles of 0 and −90 degree may be determined, according to equations (5) and (6), as follows:

$$\Delta C_j = C_{j+1} - C_j; \text{ for } j=1 \text{ to } N-1 \quad (5)$$

$$\Delta S_j = S_{j+1} - S_j; \text{ for } j=1 \text{ to } N-1 \quad (6)$$

Self-inner products of the above values may then be determined according to equations (7) and (8), as follows:

$$\Delta C \text{dot} \Delta C = \Sigma(\Delta C_j * \Delta C_j) \text{ for } j=1 \text{ to } N-1 \quad (7)$$

$$\Delta S \text{dot} \Delta S = \Sigma(\Delta S_j * \Delta S_j) \text{ for } j=1 \text{ to } N-1 \quad (8)$$

Equations 7 and 8 determine the dot product of the ΔC and ΔS values with themselves. This establishes unit magnitudes of the adjacent-sensor-differential signal dot products identified that are later identified in equations 10 and 11 (below) that may 'normalize' the system, i.e., find the relative magnitude, not of the tilt, per se, but the proportionate effect of tilt attitude on the measured signal.

In implementation, care must be taken to ensure that the measured data does not detrimentally influence the results. That is, the effects of tilt should be distinguishable from the actual spectral variations. For example, The photosensor signals for white paper around 400 nm may be considerably "noisy," because the illuminator typically has a low output at those wavelengths and a large gain is provided by the processor (whether by hardware or firmware). Thus, to keep the sharp reflectance ramp that may be typically observed between the and 420 nm (see FIG. 3) from distorting the results, calculations may be performed by eliminating noisy measurement data. For example, the 400 nm and/or 420 nm related data, such as $M_1$, $C_1$, $S_1$ and $M_2$, $C_2$, $S_2$ may be excluded or ignored Other noisy data might be similarly omitted.

Table II shows an exemplary set of a photosensor data.

TABLE II

| i | photosensor | W (nm) | Θ (deg) | C | S | ΔC | ΔS | $\Delta C_j * \Delta C_j$ | $\Delta S_j * \Delta S_j$ |
|---|---|---|---|---|---|---|---|---|---|
| 1 | 14a | 400 | 78.75 | 0.20 | 0.98 | −1.18 | −1.18 | 1.38 | 1.38 |
| 2 | 14l | 420 | 191.25 | −0.98 | −0.20 | 1.54 | −0.64 | 2.36 | 0.40 |
| 3 | 14g | 440 | 303.75 | 0.56 | −0.83 | 0.00 | 1.66 | 0.00 | 2.77 |
| 4 | 14b | 460 | 56.25 | 0.56 | 0.83 | −1.54 | −0.64 | 2.36 | 0.40 |
| 5 | 14m | 480 | 168.75 | −0.98 | 0.20 | 1.18 | −1.18 | 1.38 | 1.38 |
| 6 | 14h | 500 | 281.25 | 0.20 | −0.98 | 0.64 | 1.54 | 0.40 | 2.36 |
| 7 | 14c | 520 | 33.75 | 0.83 | 0.56 | −1.66 | 0.00 | 2.77 | 0.00 |
| 8 | 14n | 540 | 146.25 | −0.83 | 0.56 | 0.00 | −1.11 | 0.00 | 1.23 |
| 9 | 14k | 560 | 213.75 | −0.83 | −0.56 | 1.81 | 0.75 | 3.28 | 0.56 |
| 10 | 14d | 580 | 11.25 | 0.98 | 0.20 | −1.54 | 0.64 | 2.36 | 0.40 |
| 11 | 14o | 600 | 123.75 | −0.56 | 0.83 | 0.00 | −1.66 | 0.00 | 2.77 |
| 12 | 14j | 620 | 236.25 | −0.56 | −0.83 | 1.54 | 0.64 | 2.36 | 0.40 |
| 13 | 14e | 640 | 348.75 | 0.98 | −0.20 | −1.18 | 1.18 | 1.38 | 1.38 |
| 14 | 14p | 660 | 101.25 | −0.20 | 0.98 | 0.00 | −1.96 | 0.00 | 3.85 |
| 15 | 14i | 680 | 258.75 | −0.20 | −0.98 | 1.03 | 0.43 | 1.05 | 0.18 |
| 16 | 14f | 700 | 326.25 | 0.83 | −0.56 | | | | |

From this data, the self inner product of the reference components were determined according to equations (7) and (8). $\Delta C dot \Delta C = 17.35$ and $\Delta S dot \Delta S = 17.70$ (excluding data corresponding to the 400 and 420 nm photosensors).

The orientation of the sensor generally will not change with respect to the reference frame in the system. As such, the above equations may be performed ahead of time, for example, in a calibration step, resulting in stored arrays of values that may later be applied during system operation. In one implementation, the values may be stored in an associated database or memory device for later use.

The following steps may next be performed during in an operation mode of the sensor.

Spectral measurement data values $M_i$ may be obtained using the sensor 10 including measurements from each of the photosensors 14a-p.

The data values may be represented as reflectance measurement value (i.e., the amount of radiation received by a particular sensor divided by the amount of radiation emitted from an illuminator). Reflectance values typically will be represented as a percentage range from 0 to 100%.

Adjacent-wavelength-differential sensor measurements between adjacent-wavelength sensors may then be determined according to equation (9), as follows:

$$\Delta M_j = M_{j+1} - M_j \qquad (9)$$

for j=1 to N−1

Next, the dot (inner) product of the adjacent-sensor-differential signal with respect to the $\Delta C$ and $\Delta S$ is determined. This is similar in concept to the dot product of analytic geometry used to find the degree to which a given vector 'projects' onto each of the orthogonal X and Y axes. It is also similar to the Fourier Series.

The inner products of the differential sensor measurements array with the differential relative distance variations arrays for Cosine C and Sine S values may be determined according to equations (10) and (11), as follows:

$$\Delta M dot \Delta C = \Sigma(\Delta M_j * \Delta C_j) \text{ for } j=1 \text{ to } N-1 \qquad (10)$$

$$\Delta M dot \Delta S = \Sigma(\Delta M_j * \Delta S_j) \text{ for } j=1 \text{ to } N-1 \qquad (11)$$

Table III shows an exemplary set of a photosensor data for the exemplary measurement data:

TABLE III

| i | photosensor | W (nm) | M (%) | $\Delta M$ | $\Delta M_j * \Delta C_j$ | $\Delta M_j * \Delta S_j$ |
|---|---|---|---|---|---|---|
| 1 | 14a | 400 | 48.3 | 38.5 | −45.3 | −45.3 |
| 2 | 14l | 420 | 86.8 | 2.17 | 3.33 | −1.38 |
| 3 | 14g | 440 | 89.0 | −0.51 | 0.00 | −0.85 |
| 4 | 14b | 460 | 88.5 | 0.25 | −0.38 | −0.16 |
| 5 | 14m | 480 | 88.7 | −6.50 | −7.64 | 7.64 |
| 6 | 14h | 500 | 82.2 | −0.53 | −0.34 | −0.81 |
| 7 | 14c | 520 | 81.7 | 1.09 | −1.81 | 0.00 |
| 8 | 14n | 540 | 82.8 | −3.60 | 0.00 | 4.00 |
| 9 | 14k | 560 | 79.2 | −4.17 | −7.56 | −3.13 |
| 10 | 14d | 580 | 75.0 | 3.17 | −4.87 | 2.02 |
| 11 | 14o | 600 | 78.2 | −2.97 | 0.00 | 4.94 |
| 12 | 14j | 620 | 75.2 | −1.97 | −3.03 | −1.25 |
| 13 | 14e | 640 | 73.2 | 4.10 | −4.82 | 4.82 |
| 14 | 14p | 660 | 77.3 | −3.69 | 0.00 | 7.24 |
| 15 | 14i | 680 | 73.7 | −1.95 | −2.00 | −0.83 |
| 16 | 14f | 700 | 71.7 | | | |

From this data, the self inner product of the reference components were determined according to equations (10) and (11). $\Delta M dot \Delta C = -32.5$ and $\Delta M dot \Delta S = -23.6$ (excluding data corresponding to the 400 and 420 nm photosensors).

These values may then be used to estimate the effect on each individual photosensor based on that photosensors heading angle. From these values, the tilt heading and the magnitude of the tilt that correspond to the cyclic signal modulations may be determined.

The following steps "extract" the portion of the signal that projects onto the orthogonal reference headings, $\Delta C$ and $\Delta S$, which corresponds to the error due to the tilt. It may be assumed that the actual reflectance has a negligible component that is correlated to the orthogonal reference headings $\Delta C$ and $\Delta S$.

Because of this proportionality between the orthogonal reference headings, $\Delta C$ and $\Delta S$, the arctangent function may be used to find the tilt heading $\lambda\_tilt$, according to equation (12). In addition, the proportionate effect of the tilt attitude on the measured signal $\Delta M\_Tilt$ may be determined using the root-sum-square, according to equation (13).

$$\lambda\_tilt = \text{Arctangent}\_x\_y(\Delta M dot \Delta C, \Delta M dot \Delta S) \qquad (12)$$

$$\Delta M\_Tilt = \text{Square Root}[(\Delta M dot \Delta C / \Delta C dot \Delta C)^2 + (\Delta M dot \Delta S / \Delta S dot \Delta S)^2] \qquad (13)$$

From the above data, the tilt heading $\lambda\_tilt$ and the proportionate effect of the tilt attitude on the measured signal $\Delta M\_Tilt$ were determined according to equations (12) and (13). $\lambda\_tilt = 143.95$ and $\Delta M\_Tilt = 2.10$ (excluding data corresponding to the 400 and 420 nm photosensors).

Once these values are determined, corrected spectral measurement values $Mcorrected_i$ for each of the photosensors i=1 to N may be determined by subtracting an error factor proportionate to the relative sensor-to-tilt heading from each sensor spectral value, according to equation (14) as follows:

$$Mcorrected_i = M_i - \Delta M\_Tilt * \text{Cosine}[\Theta_i - \lambda\_tilt] \qquad (14)$$

for i=1 to N.

The values $Mcorrected_j$ provide corrected measurements of the target color.

Table IV shows initial measurement values and corrected measurement values for the exemplary set of a photosensor data:

TABLE IV

| i | photosensor | W (nm) | M (%) | {M (%)} or Mcorrected |
|---|---|---|---|---|
| 1 | 14a | 400 | 48.3 | {48.3} |
| 2 | 14l | 420 | 86.8 | {86.8} 85.5 |
| 3 | 14g | 440 | 89.0 | 91.0 |
| 4 | 14b | 460 | 88.5 | 88.4 |
| 5 | 14m | 480 | 88.7 | 86.8 |
| 6 | 14h | 500 | 82.2 | 83.8 |
| 7 | 14c | 520 | 81.7 | 82.4 |
| 8 | 14n | 540 | 82.8 | 80.7 |
| 9 | 14k | 560 | 79.2 | 78.5 |
| 10 | 14d | 580 | 75.0 | 76.4 |
| 11 | 14o | 600 | 78.2 | 76.2 |
| 12 | 14j | 620 | 75.2 | 75.3 |
| 13 | 14e | 640 | 73.2 | 75.1 |
| 14 | 14p | 660 | 77.3 | 75.8 |
| 15 | 14i | 680 | 73.7 | 74.5 |
| 16 | 14f | 700 | 71.7 | 73.8 |

Figure 5:
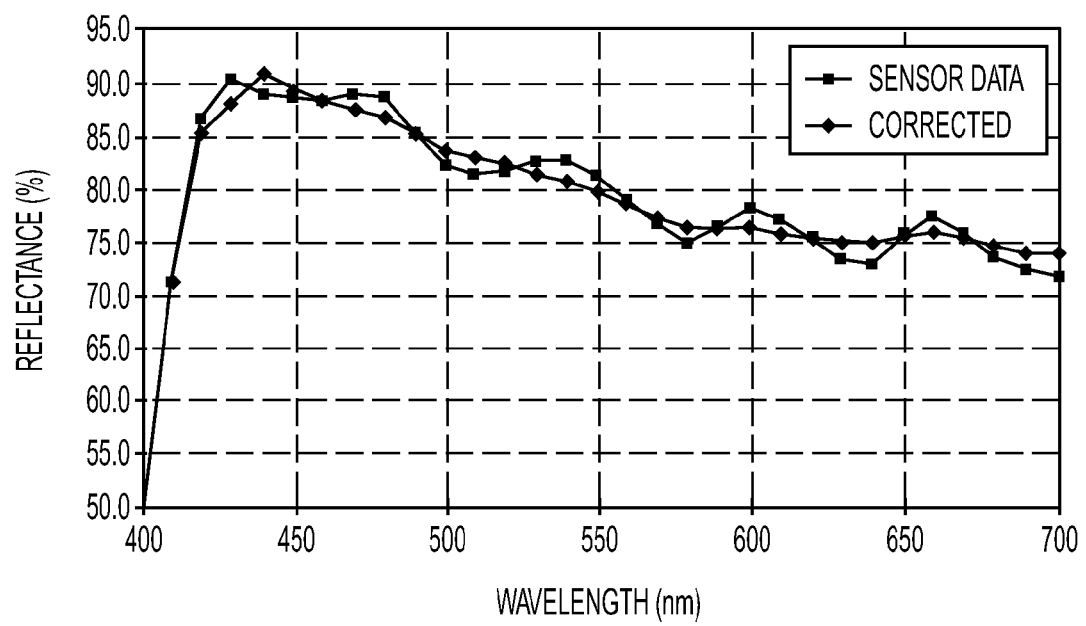
FIG. 5 shows a plot of the corrected spectral measurements values, according to an embodiment.

FIG. 5 shows a plot of the corrected spectral measurements values. As will be appreciated, the above algorithm has generally removed the cyclic variations of the measured reflectance data due to the tilt. The plot of the corrected measurements values shows a much more linear correlation between reflectance and wavelength.

In the plot shown in FIG. 5, reflectance values from a specific white paper target were used to derive the correction factors. One advantage of using white paper is that reflectance data may be somewhat uniform or linear over most of the visible range, i.e., generally in the 450 to 700 nm (wavelength) spectrum. Consequently the effect of the periodic modulation may be somewhat uniform over this range. In addition, the actual reflectance values will have a negligible component that can be correlated to the periodic modulation.

Color patch reflectance values typically do not have the same uniformity and magnitude of white paper, so it may be more difficult to obtain and apply cyclic variations due to tilt. Thus, to apply this methodology to measurements of colored patches, gain correction factors G_correction using values from a white target may be determined and subsequently applied to the spectral data from color targets accordingly to equations (15) and (16) as follows:

$$G\_correction_j = M\_white\_corrected_j / M\_white_j \quad (15)$$

$$M\_color\_corrected_j = M\_color_j * G\_correction_j \quad (16)$$

In another embodiment of the algorithm, it may be possible to subtract an $n^{th}$ order linear approximation of the measured reflectance and take the inner product of the result with arrays of undifferentiated heading reference components.

The decomposition described herein may be applied regardless of the wavelength sensitivity ordering of the sensor headings, which may have an arbitrary orientation.

In another embodiment, it may be possible to compare the sum of inner products of the $M_i$ with Cosine $[\Theta_i-\lambda ref]$ while varying the tilt heading variable to reveal the relative contributions of the modulation due to tilt according to equation (17):

$$MdotC\lambda ref = \sum M_i * \text{Cosine}[\Theta_i - \lambda ref] \quad (17)$$
$$= \sum [R_i + R_i A \text{ Cosine}[\phi_i]] * \text{Cosine}[\Theta_i - \lambda ref]$$
$$= \sum R_i * \text{Cosine}[\Theta_i - \lambda ref] +$$
$$\sum R_i A \text{ Cosine}[\phi_i] * \text{Cosine}[\Theta_i - \lambda ref]$$

Assuming that the actual spectral profile $R_i$ includes a negligible contribution that can be correlated to Cosine $[\Theta_i-\lambda ref]$, particularly given the random-like permutations of $\Theta_i$ with respect to [i] then:

$\Sigma R_i*\text{Cosine }[\Theta_i-\lambda ref]$ may be assumed to be 0; and equation (17) may simplify to equation (18):

$$MdotC\lambda ref = \sum R_i A \text{ Cosine}[\phi_i] * \text{Cosine}[\Theta_i - \lambda ref] \quad (18)$$
$$= A \sum R_i * \text{Cosine}[\Theta_i - \lambda\_tilt] * \text{Cosine}[\Theta_i - \lambda ref]$$
$$= A \sum R_i * \text{Cosine}[\zeta_i] * \text{Cosine}[\zeta_i + \Delta\lambda]$$

where: $\zeta_i = \Theta_i - \lambda tilt$ and: $\Delta\lambda = \lambda tilt - \lambda ref$.

With fixed values for $\Theta_i$ and $\lambda tilt$, and relatively uniform reflectance $R_i$, the resultant $MdotC\lambda ref$ value may be simplified as a sum of N sinusoids of the same period and so must also be a sinusoid of the same period, with maximum value at $\lambda ref = \lambda tilt$.

Figure 6:
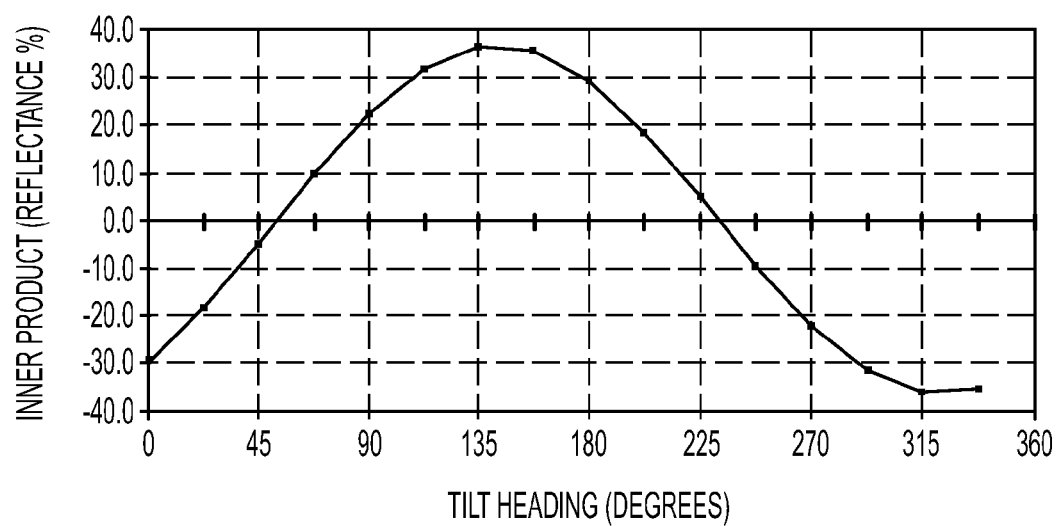
FIG. 6 shows a plot of the inner dot product and varying tilt headings, according to an embodiment.

FIG. 6 shows a plot of the inner dot product and varying tilt headings $\lambda ref$. Accordingly, $\lambda tilt$ may be determined by locating the tilt heading at which the inner dot product is maximum. The plot was created with an initial heading of 0 and a spacing of 22.5 degrees between the calculated values. In the plot shown in FIG. 6, the maximum value of $MdotC\lambda ef$ is approximately 36.6, which occurs at about 143 degrees, which is very close to the value determined using equation (13).

In addition, $\Delta M\_Tilt$ may also be determined according to equation (19), as follows:

$$\Delta M\_Tilt = \text{maximum } MdotC\lambda ref - \text{average } MdotC\lambda ref \quad (19)$$

The average $MdotC\lambda ref$ value may be determined by taking the sum of the calculated Mdot $\lambda ref$ values and dividing by the number of them. For uniformly distributed headings on a sinusoidal function, the average may be assumed to be 0.

In addition, the sinusoidal nature of the function $MdotC\lambda ref[\lambda ref]$ demonstrates that $\lambda ref = \lambda\_tilt$ can be obtained from the arctangent of values of this function for any $[\lambda ref]$ and $[\lambda ref-90 \text{ deg}]$. Thus, the above above algorithm essential accomplishes the same result by using $[\lambda ref]=0$ and the Sine $[\lambda ref]$ instead of using Cosine $[\lambda ref-90 \text{ deg}]$.

The above algorithms and embodiments may be applicable to various commercial off-the-shelf (COTS) instruments whose measurements may be affected by axial misalignment. Similarly, it may be used with instruments installed in systems with supporting mechanisms that allow some axial misalignment of the instrument with respect to either the measured surface (paper) or a calibration reference tile.

The correction algorithms provide for more accurate results without rejecting measurements or requiring repositioning of the sensor and re-measurement. Accordingly, a reduction in waste of resources, such as paper, toner, and customer and system operation time, may be realized.

In some implementations, the correction algorithms may be performed using a processor or controller (not shown). The processor may be dedicated hardware like ASICs or FPGAs, software (firmware), or a combination of dedicated hardware and software. For the different applications of the embodiments disclosed herein, the programming and/or configuration may vary. In some implementations, the sensor output may be corrected in a completely automatically manner, without requiring intervention or judgment of the user or operator.

While the above examples and embodiments are directed to substrates or inks with reflectivity in the visible spectrum, it will be appreciated the embodiments disclosed herein, may be used with other spectra, such as infrared (IR) or ultraviolet (UV).

This methodology may be applicable to commercial off-the-shelf (COTS) instruments that have the radially arrayed sensor configuration, such as the X-Rite® ILS15 radially-arrayed spectrophotometer (discussed above). However, it will be appreciated that this methodology may also be applied to a variety of different sensing technology and configurations.

This algorithm is applicable to the firmware or software for any spectrophotometer that has a similar array of sensors that are sensitive to variations in orientation or alignment with the measured target, or to any system that uses such a spectrophotometer to measure color of a substrate and provide feedback for color control and monitoring. This would include printing systems in particular, but also other color-sensitive systems such as automotive, textile, advertising, packaging, or home products. This algorithm could also apply to scientific systems and instruments that use similarly configured radiation measurement instruments. It may also apply to instruments and systems that measure parameters other than color, which consist of sensors similarly arranged, and whose signal level is similarly affected by axial misalignment or orientation with respect to the sensed artifact. With some adaptation, the algorithm can also be applied to instruments and systems that have different spatial arrangement of their sensors.

While this disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the disclosure following, in general, the principles of the invention and including such departures from the present disclosure as come within known or customary practice in the art to which the disclosure pertains, and as may be applied to the essential features hereinbefore set forth and followed in the spirit and scope of the appended claims.

What is claimed is:

1. A method for correcting misalignment of a color measuring device including a plurality of sensors and at least one illumination source, the method comprising: receiving with the plurality of sensors radiation reflected off a calibration medium from the illumination source; correlating, for each sensor in the device, the sensor measurements with at least one relative geometrical contribution based on a position of the sensor with respect to a reference frame; determining a magnitude and a phase of the misalignment based on the correlated sensor measurements; and correcting each sensor measurement based on the determined magnitude and the phase.

2. The method according to claim 1, wherein correlating comprises: determining, for each sensor, a geometrical contribution in a first direction, and in a second direction, the second direction being orthogonal to the first direction.

3. The method according to claim 2, further comprising: determining, for each sensor, adjacent-wavelength-differential relative distance variations corresponding to sensor heading angles of 0 and 90 degrees.

4. The method according to claim 3, further comprising: determining, for each sensor, self-inner products of the adjacent-wavelength-differential relative distance variations.

5. The method according to claim 1, further comprising: moving a substrate past the color measuring device in a process direction, wherein the reference frame is an axis parallel to the process direction running through the center of the device.

6. The method according to claim 1, further comprising: taking sensor measurements of a white reference substrate.

7. The method according to claim 1, wherein the sensor measurements are reflectance measurements.

8. The method according to claim 1, wherein each sensor is configured to measure light in a different wavelength of light between about 500 and 700 nm.

9. The method according to claim 1, wherein correcting each of the sensor measurement based on the magnitude and phase comprises: generating a sinusoidal correction function using the magnitude and the phase in order to correct the measured data.

10. The method according to claim 6, further comprising: correcting for a color target based on the gain of the white reference.

11. The method according to claim 1, further comprising: determining, for each sensor in the device, relative geometrical contributions based on the position with respect to the reference frame.

12. The method according to claim 1, further comprising: using the corrected sensor measurement data for measuring color.

13. A color measuring system comprising: a color measuring device including a plurality of sensors and at least one illumination source; and a processor configured to: receive with the plurality of sensors radiation reflected off a calibration medium from the illumination source; correlate, for each sensor in the device, the sensor measurements with at least one relative geometrical contribution based on a position of the sensor with respect to a reference frame; determine a magnitude and a phase of the misalignment based on the correlated sensor measurements; and correct each sensor measurement based on the determined magnitude and the phase.

14. The system according to claim 13, wherein the processor is configured to:
determine, for each sensor, a geometrical contribution in a first direction, and in a second direction, the second direction being orthogonal to the first direction.

15. The system according to claim 13, wherein the processor is configured to:
determine, for each sensor, adjacent-wavelength-differential relative distance variations corresponding to sensor heading angles of 0 and 90 degrees.

16. The system according to claim 15, wherein the processor is configured to:
determine, for each sensor, self-inner products of the adjacent-wavelength-differential relative distance variations.

17. The system according to claim 13, further comprising: a conveying device configured to move the substrate past the color measuring device in a process direction, wherein the reference frame is an axis parallel to the process direction.

18. The system according to claim 13, wherein the sensor measurements are reflectance measurements.

19. The system according to claim 13, wherein each sensor is configured to measure light in a different wavelength of light between about 500 and 700 nm.

20. The system according to claim 13, wherein the processor is configured to:
generate a sinusoidal correction function using the magnitude and the phase in order to correct the measured data.

21. The system according to claim 13, wherein the processor is configured to: determine, for each sensor in the device, relative geometrical contributions based on the position with respect to the reference frame.

* * * * *